(12) United States Patent
Ke et al.

(10) Patent No.: US 11,959,617 B1
(45) Date of Patent: Apr. 16, 2024

(54) DOWNLIGHT EMERGENCY POWER SUPPLY DEVICE

(71) Applicant: Shenzhen BillDa Technology Co., LTD, Guangdong (CN)

(72) Inventors: Jianjun Ke, Guangdong (CN); Xiaobing Liu, Guangdong (CN); Zhonghua Qiu, Guangdong (CN); Zhihong Li, Guangdong (CN)

(73) Assignee: Shenzhen BillDa Technology Co., LTD, Shenzhen (CN)

( * ) Notice: Subject to any disclaimer, the term of this patent is extended or adjusted under 35 U.S.C. 154(b) by 0 days.

(21) Appl. No.: 18/203,078

(22) Filed: May 30, 2023

(30) Foreign Application Priority Data

Jan. 13, 2023 (CN) .......................... 202310077863.8
Jan. 13, 2023 (CN) .......................... 202320156976.2
Jan. 13, 2023 (CN) .......................... 202320156992.1

(51) Int. Cl.
*F21S 9/02* (2006.01)
*F21V 21/04* (2006.01)
*F21V 21/088* (2006.01)
*H02J 9/06* (2006.01)

(52) U.S. Cl.
CPC ............ *F21S 9/022* (2013.01); *F21V 21/049* (2013.01); *F21V 21/088* (2013.01); *H02J 9/061* (2013.01)

(58) Field of Classification Search
CPC ............... F21V 21/088; F21V 21/0885; F21V 17/16–168; F21S 9/02; F21S 9/022–046
See application file for complete search history.

(56) References Cited

U.S. PATENT DOCUMENTS

2004/0218384 A1* 11/2004 Newton .................. H02J 50/10
362/183

* cited by examiner

*Primary Examiner* — Sean P Gramling (57) ABSTRACT

The application provides a downlight emergency power supply device, including an emergency power box having an accommodation cavity; a connection structure configured to fix a luminaire to the emergency power box, and comprising two clamping assemblies arranged oppositely, wherein the clamping assemblies are elastically connected to an outer side of the emergency power box; and a power supply assembly, fixed in the accommodation cavity, and configured to supply power to the luminaire; wherein the two clamping assemblies clamp and fix the luminaire in an inward or outward rebound state. By setting two clamping assemblies to clamp and fix the luminaire on the emergency power supply, it is simpler and less time-consuming to assemble than the screw mounting method used in the related art, without the need for manual screwing. Besides, the two clamping assemblies of the connection structure can be automatically clamped, achieving semi-automatic assembly, which is convenient and efficient.

17 Claims, 6 Drawing Sheets

DOWNLIGHT EMERGENCY POWER SUPPLY DEVICE

CROSS REFERENCE TO RELATED APPLICATIONS

The present application claims the benefit of Chinese Patent Application Nos. 202310077863.8, 202320156976.2 and 202320156992.1 filed on Jan. 13, 2023. All the above are hereby incorporated by reference in their entirety.

TECHNICAL FIELD

The present application relates to the field of emergency power supply technologies, in particular to a downlight emergency power supply device.

BACKGROUND

An emergency power supply is an independent power device that can provide short-term power to important loads for users when the normal power supply is interrupted. Equipping luminaires with emergency power supplies helps improve the stability of their operation. Suspended luminaires and embedded luminaires are equipped with threaded holes on their tops, allowing them to be fixed by rotating the screw of a suspension ring into the threaded hole, and then suspended using the suspension ring.

In the related art, to arrange the emergency power supply on the suspended luminaire or embedded luminaires, mounting holes are typically provided on both sides of the housing of the emergency power supply, screws are arranged through the mounting holes and the threaded holes to fix the emergency power supply on the suspended luminaire or embedded luminaires, that is, the emergency power supply and suspended luminaires or embedded luminaires are mounted through the screws, resulting in more cumbersome and time-consuming assembly steps.

SUMMARY

The technical problem to be solved by the present application is to provide a downlight emergency power supply device, aimed at solving the problem of cumbersome and time-consuming assembly steps of suspended luminaires and emergency power supply in the related art.

In order to solve the above-mentioned technical problem, the present application provides a downlight emergency power supply device, comprising:

an emergency power box having an accommodation cavity;

a connection structure configured to fix a luminaire to the emergency power box, and comprising two clamping assemblies arranged oppositely, wherein the clamping assemblies are elastically connected to an outer side of the emergency power box; and a power supply assembly, fixed in the accommodation cavity, and configured to supply power to the luminaire;

wherein the two clamping assemblies clamp and fix the luminaire when the two clamping assemblies are in an inward or outward rebound state.

Compared to the related art, the downlight emergency power supply device in the present application has the beneficial effects as follows. By setting two clamping assemblies to clamp and fix the luminaire on the emergency power supply, it is simpler and less time-consuming to assemble than the screw mounting method used in the related art, without the need for manual screwing. Besides, the two clamping assemblies of the connection structure can be automatically clamped, achieving semi-automatic assembly of the luminaire and the downlight emergency power supply device, which is convenient and efficient.

BRIEF DESCRIPTION OF THE DRAWINGS

In order to illustrate technical solutions of the embodiments of the present application or the related art more clearly, the accompanying drawings required in the embodiments or the related art will be briefly introduced below. Obviously, the accompanying drawings in the following description are only some embodiments of the present application. For those of ordinary skill in the art, other accompanying drawings may also be obtained from these accompanying drawings without creative effort.

In the accompanying drawings, each figure label indicates: 1, emergency power box; 11, mounting slot; 12, housing; 13, base; 14, partition member; 15, window; 16, wire hole; 2, connection structure; 21, clamping assembly; 211, sliding rod; 212, clamping member; 213, blocking portion; 214, elastic member; 22, connection box; 221, box body; 222, cover plate; 223, bypass hole; 224, partition plate; 3, power supply assembly; 4, flip plate; 5, second fastening structure; 6, third fastening structure; 7, first connection structure; 8, second connection structure; 9, adjustment member; and 10, terminal board.

DETAILED DESCRIPTION OF THE EMBODIMENTS

Embodiments of the present application are described in detail below, and examples of the embodiments are shown in the accompanying drawings, in which the same or similar labels from beginning to end indicate the same or similar elements or elements having the same or similar functions. The embodiments described below with reference to the accompanying drawings are exemplary and are intended to be used to explain the invention and are not to be construed as limiting the invention. All other embodiments obtained without creative labor by the person having ordinary skill in the art, based on the embodiments in the present application, fall within the protection scope of the present application.

EMBODIMENTS

Referring to FIGS. 1 to 6, embodiments of the present application provide a downlight emergency power supply device comprising an emergency power box 1, a connection structure 2, and a power supply assembly 3. The connection structure 2 is mounted at a bottom end of the emergency power box 1, and the connection structure 2 is configured to fix a luminaire to the emergency power box 1, and the power supply assembly 3 is configured to supply power to the luminaire.

The emergency power box 1 has an accommodation cavity, and the connection structure 2 includes two clamping assemblies 21 arranged oppositely, which are elastically connected to an outer side of the emergency power box 1. The power supply assembly 3 is fixed in the cavity. When the two clamping assemblies 21 are in the opposite or outward rebound state, the two clamping assemblies 21 clamp and fix the luminaire. By setting two clamping assemblies 21 to clamp and fix the luminaire on the emergency power supply, it is simpler and less time-consuming to assemble than the screw mounting method used in the related art, without the need for manual screwing. Besides, the two clamping assemblies 21 of the connection structure 2 can be automatically clamped, achieving semi-automatic assembly of the luminaire and the downlight emergency power supply device, which is convenient and efficient.

Figure 3:
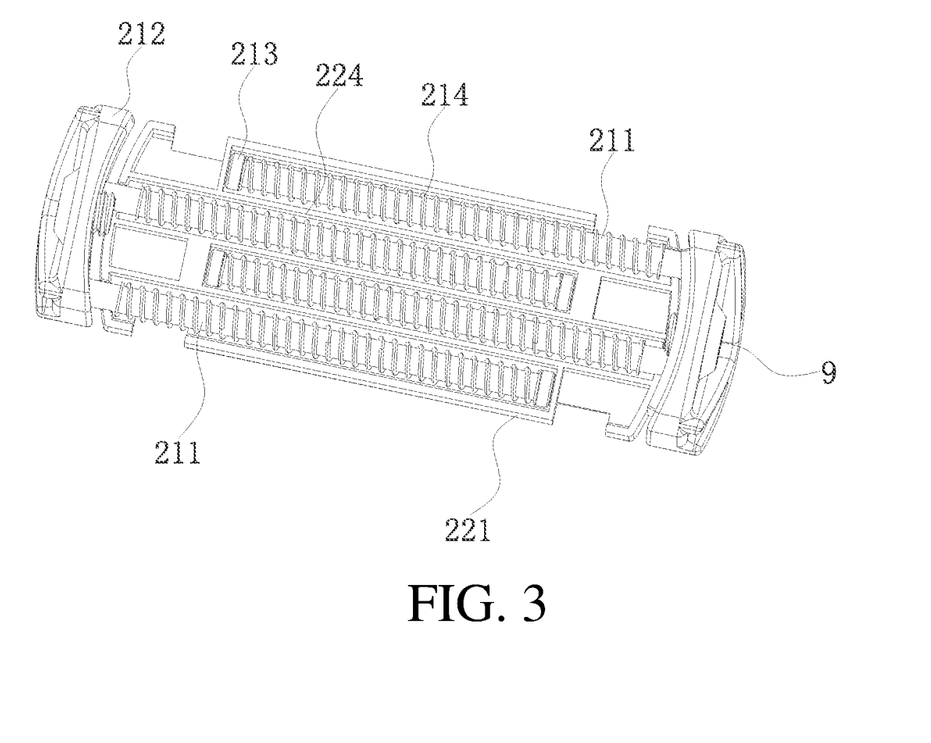
FIG. 3 shows a structural diagram of a connection structure with a cover plate removed and the two clamping members in the inward rebound state according to an embodiment of the present application.
Figure 6:
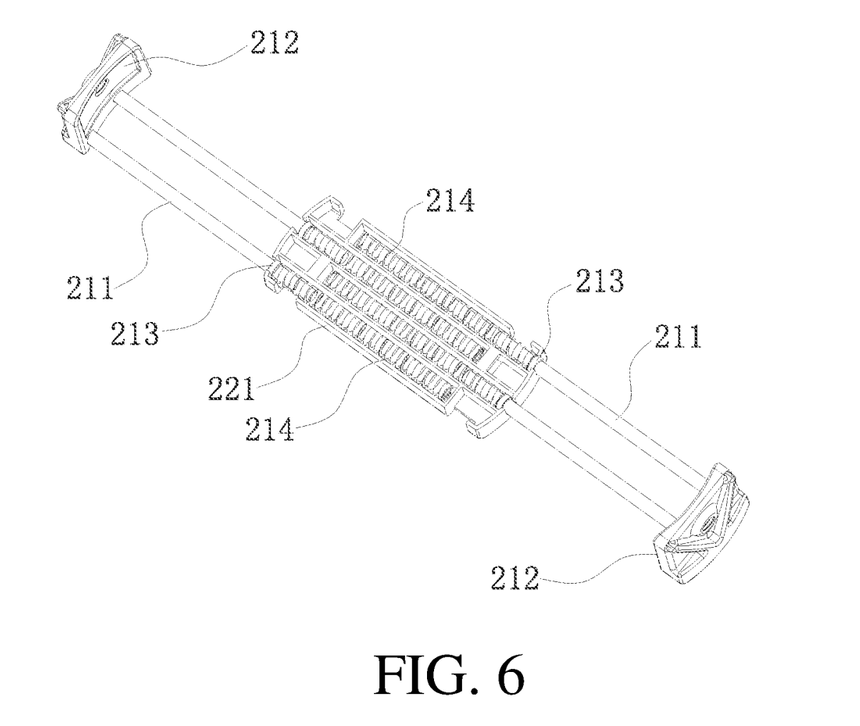
FIG. 6 shows a structural diagram of the connection structure with the cover plate removed and the two clamping members in the inward rebound state according to an embodiment of the present application.

Referring to FIG. 3 and FIG. 6, in one embodiment, the connection structure 2 further includes a connection box 22 fixed to the emergency power box 1 and having a limit cavity. Each clamping assembly 21 includes a sliding rod 211 slidably assembled in the limit cavity at one end and the other end extending outside the limit cavity, and a clamping member 212 fixed to the sliding rod 211 and located outside the limit cavity. The sliding rod 211 is elastically connected to the connection box 22, and the clamping members 212 of the two clamping assemblies 21 are distributed at opposite ends of the connection box 22. When the two clamping members 212 are in the opposite or outward rebound state, the two clamping members 212 clamp the fix the luminaire.

It should be understood that since one end of each sliding rod 211 is slidably assembled inside the limit cavity and the other end thereof extends outside the limit cavity. The sliding rods 211 are elastically connected to the connection box 22, and the clamping members 212 are fixed to the sliding rods 211 and located outside the limit cavity, so that the clamping members 212 are elastically connected to the connection box 22 through the sliding rods 211, thus enabling the two clamping members 212 to clamp and fix different types and sizes of suspended luminaires and embedded luminaires, without producing emergency power box 1 with different sizes of mounting holes, which can reduce production costs. Besides, during the process of securing the luminaire to the emergency power source box 1 using the connection structure 2, there is no requirement for screws, eliminating the need for manual screwing, and making the mounting and fixing method simple.

It should be noted that when the two clamping members 212 are in the inward rebound state, the two clamping members 212 clamp and fix the luminaire inward. When the two clamping members 212 are in the outward rebound state, the two clamping members 212 clamp and fix the luminaire outward. An end of the clamping member 212 away from the sliding rod 211 protrudes from a contact side surface of the connection box 22, to provide sufficient contact area between the clamping members 212 and the luminaire, ensuring an appropriate level of friction between the clamping members 212 and the luminaire, and preventing the luminaire from falling during the clamping process. Additionally, it facilitates the application of force from the clamping members 212 to the lamp.

Figure 1:
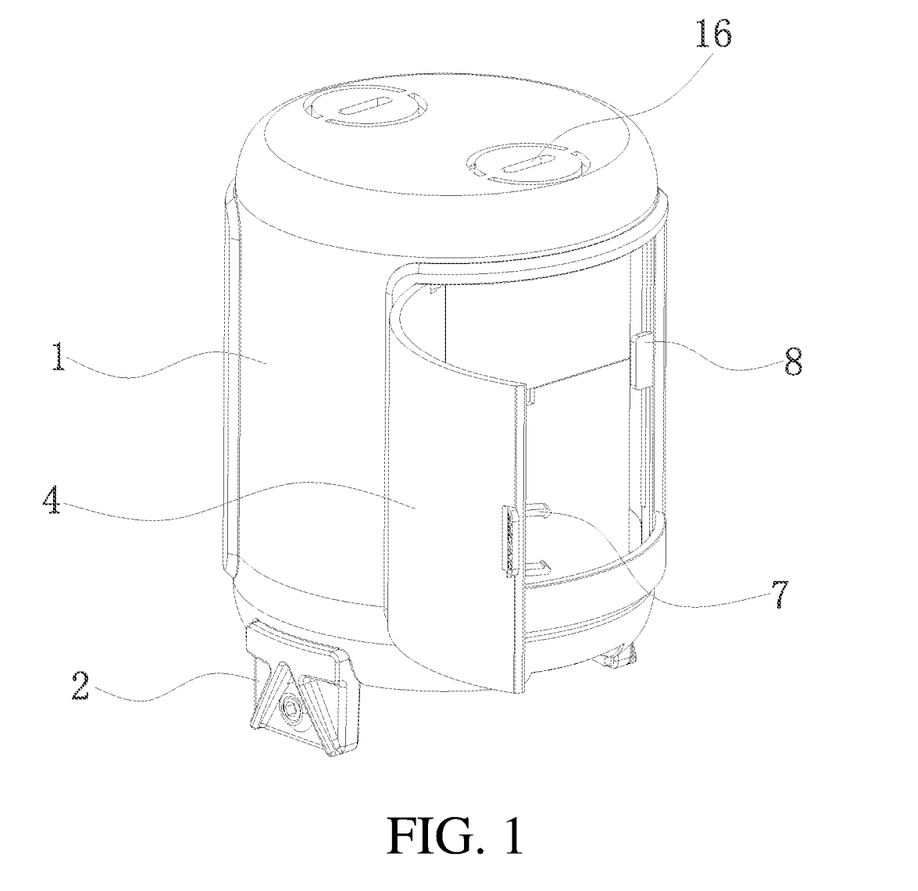
FIG. 1 shows a diagram of an overall structure of two clamping members of a downlight emergency power supply device in an inward rebound state according to an embodiment of the present application.
Figure 2:
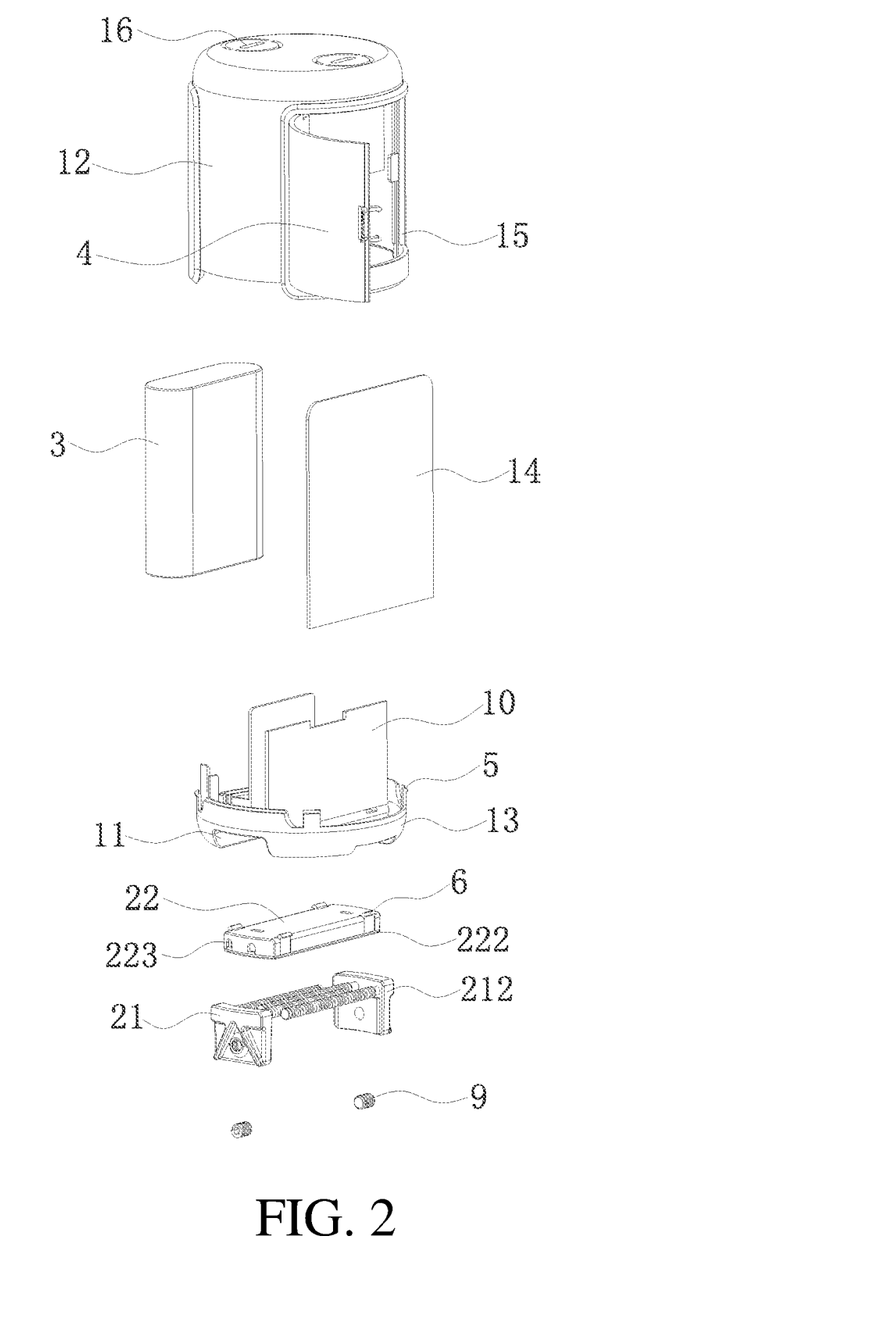
FIG. 2 shows an exploded view of the two clamping members of the downlight emergency power supply device in the inward rebound state according to an embodiment of the present application.

Referring to FIGS. 1, 2, and 3, in one embodiment, each clamping assembly 21 further includes a blocking portion 213 formed by the outward projection of the outer side of the sliding rod 211, and an elastic member 214 sleeved on the outer side of the sliding rod 211 and located in the limit cavity. The blocking portion 213 is located in the limit cavity. One end of the elastic member 214 is abutted against an end of the blocking portion 213 close to the clamping member 212, and the other end thereof is abutted against the wall of the limit cavity to provide a rebound force for the clamping member 212 to rebound in a direction toward the limit cavity. Specifically, the blocking portion 213 may be circular in shape. The blocking portion 213 is located at the end of the sliding rod 211, i.e., a side of the blocking portion 213 away from the clamping member 212 can be abutted against the wall of the limit cavity. The elastic member 214 may be a spring. In an initial state, the blocking portion 213 is abutted against the wall of the limit cavity, and the clamping members 212 are abutted against the outer side of the connection box 22, so that the elastic member 214 does not produce elastic deformation. In a clamping state, the sliding rod 211 slides outward to drive the blocking portion 213 to move, and the elastic member 214 produces elastic deformation due to the combined compression from the blocking portion 213 and the wall of the limit cavity. Under the interaction of forces, the clamping members 212 receive the rebound forces provided by the elastic members 214, allowing the two clamping assemblies 212 to clamp and fix the luminaire.

In a specific clamping process, one clamping member 212 is pushed until a space between the two clamping members 212 fits the luminaire. The luminaire is placed in the space between the two clamping members 212 and the clamping member 212 is released. Then, the two clamping members 212 interact with each other until reaching equilibrium. The elastic member 214 produces elastic deformation under the combined compression from the blocking portion 213 and the wall of the limit cavity, and produces a rebound force that rebounds in the direction towards the limit cavity, so that the two clamping members 212 can clamp and fix the luminaire, specifically, the two clamping members 212 clamp and fix the luminaire inward.

Figure 4:
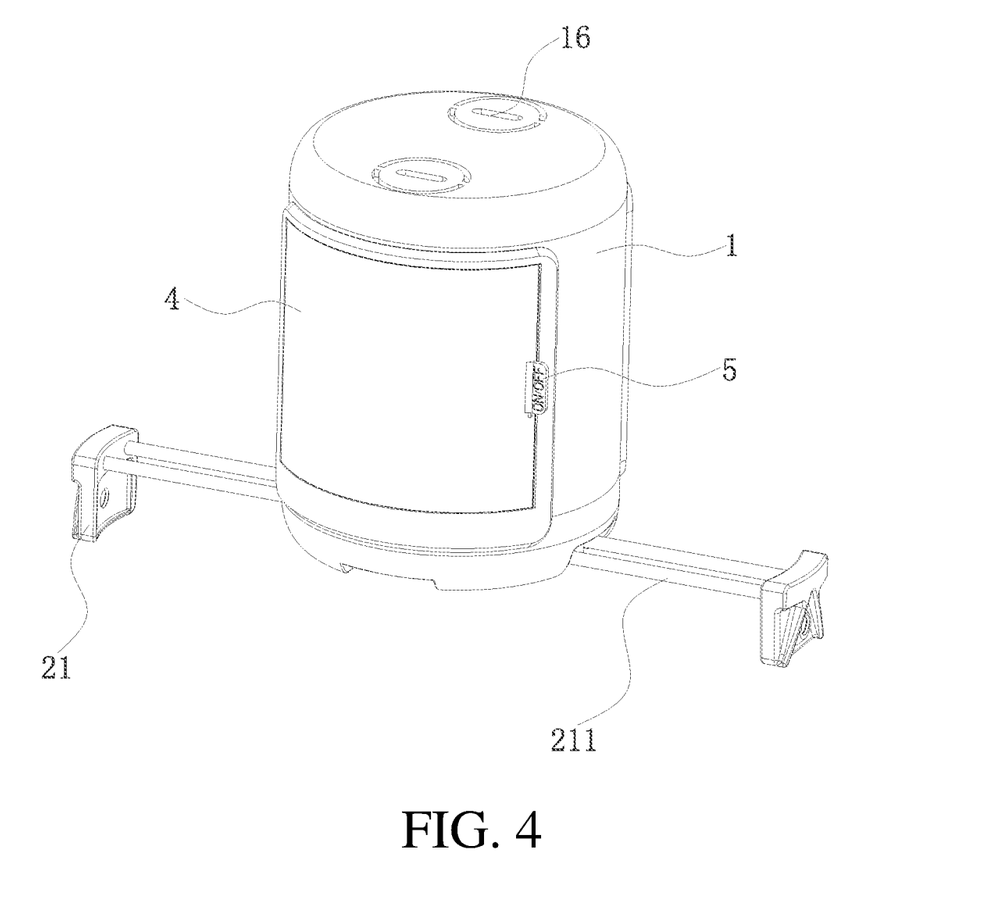
FIG. 4 shows a diagram of an overall structure of the two clamping members of the downlight emergency power supply device in an outward rebound state according to an embodiment of the present application.
Figure 5:
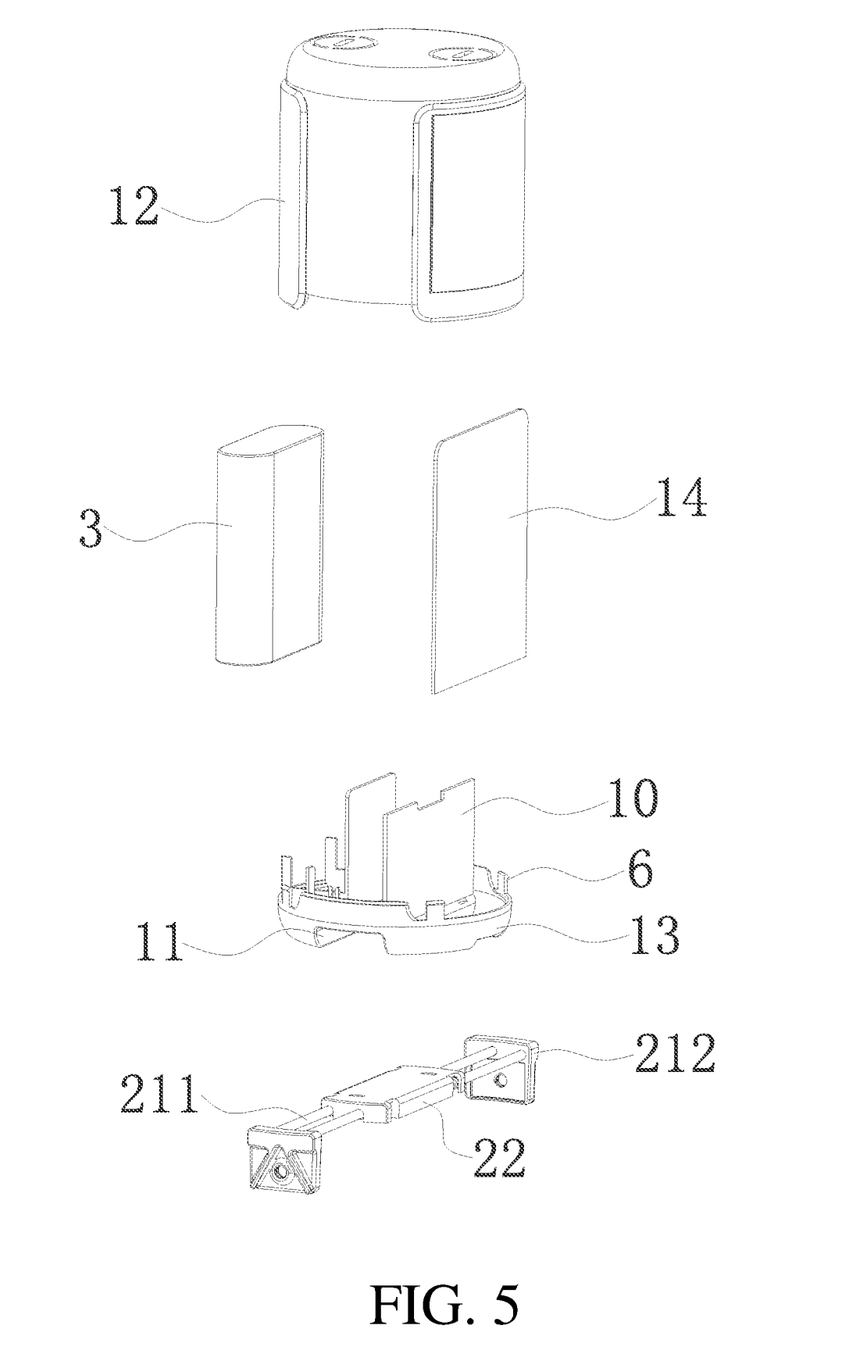
FIG. 5 shows an exploded view of the two clamping members of the downlight emergency power supply device in the outward rebound state according to an embodiment of the present application.

Referring to FIGS. 4, 5, and 6, in one embodiment, each clamping assembly 21 further includes a blocking portion 213 formed by projecting outwardly from the outer side of the sliding rod 211, and an elastic member 214 sleeved on the outer side of the sliding rod 211 and located in the limit cavity. The blocking portion 213 is located at an end of the sliding rod 211 extending into the limit cavity. One end of the elastic member 214 is abutted against an end of the blocking portion 213 close to the clamping member 212, and the other end thereof is abutted against the wall of the limit cavity to provide a rebound force for the clamping member 212 to rebound in the direction toward the limit cavity. Specifically, the blocking portion 213 may be circular in shape. The blocking portion 213 is located between the two ends of the sliding rod 211, and a side of the blocking portion 213 close to the clamping member 212 is abutted against the wall of the limit cavity. The elastic member 214 may be a spring. In an initial state, the blocking portion 213 is abutted against the wall of the limit cavity, and the clamping members 212 are spaced apart from the outer side of the connection box 22, so that the elastic member 214 does not produce elastic deformation. In a clamping state, the sliding rod 211 slides inward to drive the blocking portion 213 to move, and the elastic member 214 produces elastic deformation under the combined compression from the blocking portion 213 and the wall of the limit cavity. Under the interaction of forces, the clamping member 212 is subjected to the rebound force provided by the elastic member 214, so that the two clamping members 212 can claim and fix the luminaire.

In a specific clamping process, one clamping member 212 is pressed until the space between the two clamping members 212 fits the luminaire. The luminaire is placed in the space between the two clamping members 212 and the clamping member 212 is released. Then the two clamping members 212 interact with each other until reaching equilibrium, and the elastic member 214 produces elastic deformation under the combined compression from the blocking portion 213 and the wall of the limit cavity, and produces a rebound force in a direction away from the limit cavity, so that the two clamping members 212 can clamp the fix the luminaire, specifically, the two clamping members 212 clamp and fix the luminaire outward.

Referring to FIG. 2 and FIG. 5, in one embodiment, the outer side of the emergency power box 1 is provided with a mounting slot 11 that fits the connection box 22, so that the connection box 22 is fastened in the mounting slot 11, and the two clamping members 212 are located at opposite ends of the connection box 22. The mounting slot 11 may be a rectangular slot. Since the connection box 22 is fastened and fixed in the mounting slot 11, there is no need for screw fixation, thereby reducing the complexity of materials and assembly in the production process. The two clamping members 212 are located at opposite ends of the connection box 22, which is conducive to fix the luminaire on the emergency power box 1 by the connection structure 2. In one embodiment, each side wall of the box body 221 facing toward the clamping member 212 is provided with a bypass hole 223, and the sliding rod 211 extends outside the limit cavity through the bypass hole 223. An outer diameter of each blocking portion 213 and an outer diameter of each elastic member 214 is larger than an outer diameter of each bypass hole 223, so that both the blocking portion 213 and the elastic member 214 cannot be detached from the limit cavity and the elastic member 214 is guaranteed to be squeezed by the blocking portion 213 and the limit cavity wall.

Referring to FIG. 2 and FIG. 5, in one embodiment, the cover plate 222 is provided with a third fastening structure 6, which is configured to fasten with the fourth fastening structure provided in the emergency power box 1. Specifically, the third fastening structure 6 is a plurality of fastening members fixed in the cover plate 222, and each fastening member is arranged around the box body 221. The fourth fastening structure provided in the emergency power box 1 is a fastening slot. When the fastening member is fastened in the corresponding fastening slot, the connection box 22 is fixed in the emergency power box 1. In one embodiment, there may be four fastening members, and the four corner areas of the box 221 are provided with fastening slots, so that the four fastening members are located in the fastening slots, respectively. When the fastening members are fastened in the fastening slots, the cover plate 222 is fixedly connected to the emergency power box 1, and the box 221 is pressed and fixed on the emergency power box 1 by the cover plate 222. According to the practical need, the third fastening structure 6 may be arranged in the fastening slot of the cover plate 222, and the fourth fastening structure may be a fastening member fixed in the emergency power box 1.

Referring to FIG. 3 and FIG. 6, in one embodiment, the connection box 22 further includes a plurality of partition plates 224 fixed in the limit cavity and spaced apart, and the plurality of partition plates 224 separate the limit cavity to form a plurality of independently set limit sub-cavities. Each clamping assembly 21 is provided with a plurality of sliding rods 211, and the plurality of limit sub-cavities correspond to the plurality of sliding rods 211 one-to-one. Specifically, the partition plates 224 are fixed to the bottom of the box body 221. There are three pieces of the partition plate 224, and the three pieces of the partition plate 224 separate the limit cavity to form four independently set limit sub-cavities. Each clamping assembly 21 is provided with two sliding rods 211, and each sliding rod 211 is connected to an elastic member 214, so that the two elastic members 214 provide rebound force to the clamping member 212, enhancing the rebound force of the clamping member 212, and thereby increasing the clamping force of the two clamping components 212 to clamp the luminaire. In one embodiment, a sliding rod 211 of another clamping assembly 21 is provided between two adjacent sliding rods 211 of the same clamping assembly 21, i.e., the two sliding rods 211 connected to the same clamping member 212 have a slight gap, which is conducive to ensuring that the clamping member 212 is subject to balanced force.

Referring to FIGS. 2 and 4, in one embodiment, each clamping member 212 is provided with a threaded hole, and each clamping assembly 21 further includes an adjustment member 9 threadedly assembled in the threaded hole, with the adjustment member 9 moving in a direction parallel to the sliding direction of the sliding rod 211. Specifically, the adjustment member 9 may be a stud, and the clamping degree of the two clamping members 212 clamping the luminaire is changed by adjusting the length of the adjustment member 9 out of each clamping member 212. According to practical needs, each clamping member 212 may be a flat plate, and a side of each clamping member 212 close to the connection box 22 can form a soft rubber layer or adhesive backing/adhesive layer through the encapsulation process, to avoid damage to the luminaire due to extrusion and increase the elasticity and anti-slip function when the clamping members 212 contact the luminaire.

Referring to FIGS. 3 and 6, in one embodiment, the emergency power box 1 includes a housing 12 with an accommodation cavity, a base 13 fixed to the housing 12 and closing the accommodation cavity, and a partition member 14 fixed to the base 13 and the housing 12 at each end and located in the accommodation cavity. The partition member 14 separates the accommodation cavity to form two independently set accommodation sub-cavities. One of the two accommodation sub-cavities is provided with a power supply assembly 3 to form a power supply cavity and the other to form a wiring cavity, so that the wiring cavity and the power supply cavity are independently set, i.e., the emergency power box 1 has separate wiring area and power supply area.

Referring to FIGS. 1 and 4, in one embodiment, a perimeter side of the housing 12 is provided with window 15, and the window 15 reveals the wiring cavity. The downlight emergency power supply device further includes a flip plate 4 rotatably connected to one side of the window 15, the flip plate 4 is configured to close or open the window 15. The end of the housing 12 away from the base 13 and the base 13 are both provided with two wire holes 16 spaced apart, and the two wire holes 16 located on the housing 12 are connected to the wiring cavity and the power cavity, and the two wire holes 16 located on the base 13 are connected to the wiring cavity and the power cavity. Specifically, the housing 12 may be in the shape of a cylinder, the two wire holes 16 on the housing 12 and the two wire holes 16 on the base 13 are all provided with a disposable protective sheet, which can protect the accommodation cavity before wiring, and can be removed directly when threading. It should be understood that, since the circumference of the housing 12 is provided with the window 15 to reveal the wiring cavity, the wiring operation in the terminal board 10 when the light will not interfere with the wiring, making the wiring operation convenient and fast. The wires can be introduced or extracted from the top and bottom of the housing 12, making the wiring method simple. In one embodiment, the two wire holes 16 located on the base 13 are distributed on both sides of a connection line between the two clamping assemblies 21, which allows for the introduction and extraction of cables without interfering with the clamping of the luminaire by the clamping members 212.

Referring to FIGS. 2 and 5, in one embodiment, a side wall of the housing 12 close to an end of the base 13 is provided with a first fastening structure. An outer side of the base 13 is provided with a second fastening structure 5, and the first fastening structure is fastened with the second fastening structure 5. The use of fastening fixation eliminates the need for screw mounting, thereby reducing the complexity of material and assembly processes. Specifically, the first fastening structure includes a fastening slot opened in the side wall of the housing 12, and the second fastening structure 5 includes a fastening member fixed in the base 13. The fastening member is fastened in the fastening slot. The fastening member may be a snap fastener, and there are four fastening members. The fastening slot may be a slot, and there are four fastening slots. According to practical needs, the first fastening structure may be a fastening slot, and the second fastening structure 5 may be a fastening member.

Referring to FIGS. 1, 2, and 3, in one embodiment, the emergency power box 1 further includes connection shafts fixed to the flip plate 4 at one end and rotatably connected to the side wall of the window 15 at the other end. There are two connection shafts, and a connection line between the two connection shafts is parallel to the length direction of the corresponding side wall of the window 15, so that the flip plate 4 is rotatably connected to the side wall of the window 15, so that it can be rotated on the housing to open or close the window 15.

Referring to FIGS. 1 and 4, in one embodiment, the emergency power box 1 further includes a first connection structure 7 provided on the flip plate 4 and a second connection structure 8 provided on the housing. When the first connection structure 7 and the second connection structure 8 are connected, the flip plate 4 covers the wiring cavity. When the first connection structure 7 and the second connection structure 8 are separated, the flip plate 4 opens the wiring cavity. Specifically, the first connection structure 7 includes a snap hook fixed to s free side of the flip plate 4, and the second connection structure 8 includes a snap plate set in the housing, and the snap hook is capable of snap connecting to the snap plate. According to practical needs, the first connection structure 7 and the second connection structure 8 may be fixed by magnetic suction, that is, both the first connection structure 7 and the second connection structure 8 may be magnetic members.

Referring to FIG. 1, in one embodiment, the snap hook includes a main portion fixed to the flip plate 4, and two corner hook portions fixed to the main portion and spaced apart. When the snap hook is fastened to the snap plate, the two corner hook portions are located at opposite ends of the snap plate, so that the snap hook can be fastened to the snap plate.

Referring to FIGS. 2 and 5, in one embodiment, the power supply assembly 3 includes a power supply fixed in the power supply cavity. The terminal board 10 is fixed in the power supply cavity, and the power supply is electrically connected to the terminal board 10. The power supply may be a battery, and the power supply is connected to the circuit through the terminal board 10. According to the practical needs, the partition member 14, the power supply components 3, and the terminal board 10 may all be fixed in the base 13. One end of the lead-in wires is connected to the terminal board 10 and the other end thereof is connected to an external power supply to access AC power. One end of the lead-out wires is connected to the terminal board 10 and the other end thereof is connected to the luminaire, thereby supplying AC power to the luminaire. When the external power supply fails, the power supply is connected to the terminal board 10 to supply power to the luminaire.

Described above are only preferable embodiments of the present application, and are not intended to limit the present application. Any modification, equivalent replacement, and improvement made within the spirit and principles of the present application shall be included in the protection scope of the present application.

What is claimed is:

1. A downlight emergency power supply device, comprising:
    an emergency power box having an accommodation cavity;
    a connection structure configured to fix a luminaire to the emergency power box, and comprising two clamping assemblies arranged oppositely, wherein the clamping assemblies are elastically connected to an outer side of the emergency power box; and
    a power supply assembly, fixed in the accommodation cavity, and configured to supply power to the luminaire;
    wherein the two clamping assemblies clamp and fix the luminaire when the two clamping assemblies are in an inward or outward rebound state;
    wherein the connection structure further comprises a connection box fixed to the emergency power supply box and having a limit cavity; each of the clamping assemblies comprises a sliding rod slidably assembled in the limit cavity at one end and extending outside the limit cavity at the other end, and a clamping member fixed to the sliding rod and located outside the limit cavity; wherein the sliding rod is elastically connected to the connection box, the clamping members of the two clamping assemblies are distributed at opposite ends of the connection box; the two clamping members clamp and fix the luminaire when the two clamping members are in an inward or outward rebound state.

2. The downlight emergency power supply device of claim 1, wherein each of the clamping assemblies further comprises a blocking portion formed by projecting outwardly from an outer side of the sliding rod, and an elastic member sleeved on the outer side of the sliding rod and located in the limit cavity; wherein the blocking portion is located in the limit cavity; one end of the elastic member is abutted against an end of the blocking portion close to the clamping member, and the other end of the elastic member is abutted against a wall of the limit cavity to provide a rebound force for the clamping members to rebound in a direction toward the limit cavity.

3. The downlight emergency power supply device of claim 2, wherein the connection box comprises a box body having the limit cavity, and a cover plate fixed to the box body and capped on the limit cavity; wherein the box body is provided with a bypass hole in a side wall opposite to the clamping member; the sliding rod is extended outside the limit cavity through the bypass hole; an outer diameter of the blocking portion and an outer diameter of the elastic member are both greater than an outer diameter of the bypass hole.

4. The downlight emergency power supply device of claim 3, wherein the cover plate is provided with a third fastening structure configured to fasten with a fourth fastening structure provided in the emergency power supply box; wherein the third fastening structure is a plurality of fastening members fixed to the cover plate; each of the fastening members is arranged around the box; the fourth fastening structure provided in the emergency power supply box is a fastening slot; when the fastening members are fastened in the fastening slot correspondingly, the connection box is fixed to the emergency power box.

5. The downlight emergency power supply device of claim 1, wherein each of the clamping assemblies further comprises a blocking portion formed by projecting outwardly from an outer side of the sliding rod, and an elastic member provided in the limit cavity; wherein the blocking portion is located in the limit cavity; one end of the elastic member is abutted against an end of the blocking portion away from the clamping member, and the other end of the elastic member is abutted against a wall of the limit cavity to provide a rebound force for the clamping members to rebound in a direction away from the limit cavity.

6. The downlight emergency power supply device of claim 1, wherein an outer side of the emergency power supply box is provided with a mounting slot adapted to the connection box, wherein the connection box is fastened and fixed in the mounting slot, and the two clamping members are located at opposite ends of the connection box.

7. The downlight emergency power supply device of claim 1, wherein the connection box further comprises a plurality of partition plates fixed in the limit cavity and spaced apart, wherein the plurality of partition plates separates the limit cavity to form a plurality of independently set limit sub-cavities; each of the clamping assemblies is provided with a plurality of the sliding rods, and the plurality of the limit sub-cavities correspond to a plurality of the sliding rods one to one.

8. The downlight emergency power supply device of claim 1, wherein each of the clamping members is provided with a threaded hole and an adjustment member threadedly assembled in the threaded hole, wherein a movement direction of the adjustment member is parallel to a sliding direction of the sliding rod.

9. The downlight emergency power supply device of claim 1, wherein the emergency power box comprises a housing having the accommodation cavity, a base fixed to the housing and closing the accommodation cavity, and a partition member fixed to the base and the housing at each end and located in the accommodation cavity, wherein the partition member separates the accommodation cavity to form two independently set accommodation sub-cavities, one of the two accommodation sub-cavities is provided with the power supply assembly to form a power supply cavity, and the other of the two accommodation sub-cavities forms a wiring cavity.

10. The downlight emergency power supply device of claim 9, wherein a perimeter side of the housing is provided with a window, wherein the window reveals the wiring cavity; the downlight emergency power supply device further comprises a flip plate rotatably connected to one side of the window and configured to close or open the window.

11. The downlight emergency power supply device of claim 10, wherein the emergency power box further comprises a first connection structure arranged in the flip plate and a second connection structure arranged in the housing; when the first connection structure and the second connection structure are connected, the flip plate closes the wiring cavity; when the first connection structure and the second connection structure are separated, the flip plate opens the wiring cavity.

12. The downlight emergency power supply device of claim 11, wherein the first connection structure comprises a snap hook fixed to a free side of the flip plate, and the second connection structure comprises a snap plate arranged in the housing; the snap hook is capable of snap connecting to the snap plate.

13. The downlight emergency power supply device of claim 12, wherein the snap hook comprises a main portion fixed to the flip plate, and two corner hook portions fixed to the body portion and spaced apart; when the snap hook is snap connected to the snap plate, the two corner hook portions are located at opposite ends of the snap plate, respectively.

14. The downlight emergency power supply device of claim 10, wherein the emergency power box further comprises connection shafts, one end of which is fixed to the flip plate and the other end of which is rotatably connected to a side wall of the window; the number of the connection shaft is two, and a connection line between the two connection shafts is parallel to a length direction of the corresponding side wall of the window.

15. The downlight emergency power supply device of claim 10, wherein an end of the housing away from the base end and the base are both provided with two wire holes spaced apart, wherein the two wire holes located on the housing are connected to the wiring cavity and the power cavity, respectively, and the two wire holes located on the base are connected to the wiring cavity and the power cavity respectively and distributed on both sides of a connection line between the two clamping assemblies.

16. The downlight emergency power supply device of claim 9, wherein a side wall of the housing close to an end of the base is provided with a first fastening structure, and an outer side of the base is provided with a second fastening structure, wherein the first fastening structure is fastened with the second fastening structure; the first fastening structure comprises a fastening slot opened in the side wall of the housing, and the second fastening structure includes a fastening member fixed to the base; and the fastening member is fastened in the fastening slot.

17. The downlight emergency power supply device of claim 9, wherein the power supply assembly comprises a power supply fixed in the power supply cavity; a terminal board is fixed in the power supply cavity, and the power supply is electrically connected to the terminal board.

* * * * *